United States Patent
Lee et al.

(10) Patent No.: US 8,610,371 B2
(45) Date of Patent: Dec. 17, 2013

(54) CIRCUITRY TO DRIVE PARALLEL LOADS SEQUENTIALLY

(75) Inventors: Nai-Chi Lee, Nashua, NH (US); Gregory Szczeszynski, Hollis, NH (US); Vijay Mangtani, Nashua, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 209 days.

(21) Appl. No.: 13/334,250

(22) Filed: Dec. 22, 2011

(65) Prior Publication Data

US 2013/0162152 A1    Jun. 27, 2013

(51) Int. Cl.
*H05B 37/02* (2006.01)
*H05B 39/04* (2006.01)

(52) U.S. Cl.
USPC .......................................... 315/291; 315/294

(58) Field of Classification Search
USPC ......... 315/291, 294, 295, 297, 299, 300, 301, 315/307, 312, 323, 246, 185 R, 185 S, 209 R
See application file for complete search history.

(56) References Cited

U.S. PATENT DOCUMENTS

| | | | |
|---|---|---|---|
| 7,948,468 B2 * | 5/2011 | Zane et al. ..................... | 345/102 |
| 2008/0048573 A1 | 2/2008 | Ferentz et al. | |
| 2008/0202312 A1 | 8/2008 | Zane et al. | |
| 2010/0283322 A1 | 11/2010 | Wibben | |
| 2010/0295472 A1 | 11/2010 | Wibben et al. | |
| 2011/0074839 A1 * | 3/2011 | Liu et al. ..................... | 345/690 |
| 2011/0109248 A1 | 5/2011 | Liu | |
| 2011/0285311 A1 * | 11/2011 | Yang et al. ................... | 315/291 |
| 2011/0298384 A1 * | 12/2011 | Tanigawa et al. ......... | 315/209 R |

FOREIGN PATENT DOCUMENTS

| | | |
|---|---|---|
| DE | 10 2005 056338 | 5/2007 |
| WO | WO 2009/064682 | 5/2009 |

OTHER PUBLICATIONS

Notification of Transmittal of the International Search Report and the Written Opinion of the International Searching Authority, or the Declaration, PCT/US2012/061779, date of mailing Mar. 7, 2013, 7 pages.
Written Opinion of the International Searching Authority, PCT/US2012/061779, date of mailing Mar. 7, 2013, 8 pages.

* cited by examiner

*Primary Examiner* — Minh D A
(74) *Attorney, Agent, or Firm* — Daly, Crowley, Mofford & Durkee, LLP

(57) ABSTRACT

In one aspect, a circuit includes a plurality of comparators. Each comparator is configured to receive a first input from a corresponding load of a plurality of loads and to receive a second input as a regulation voltage. The circuit also includes an amplifier configured to receive signals provided by the plurality of comparators, a pulse-width modulation (PWM) circuit configured to receive a control signal from the amplifier and to provide a signal to a primary switch to control voltage provided to the loads and an output switch sequencer coupled to each of the comparators and configured to provide control signals to control switches coupled to the primary switch enabling one control switch to be active at a time. Each control switch provides a voltage increase to a respective load of the plurality of loads if enabled.

10 Claims, 5 Drawing Sheets

CIRCUITRY TO DRIVE PARALLEL LOADS SEQUENTIALLY

BACKGROUND

A variety of electronic circuits are used to drive diode loads and, more particularly, to control electrical current through strings of series-connected light-emitting diodes (LEDs), which, in some examples, form an LED display, or, more particularly, a backlight for a display, for example, a liquid crystal display (LCD). It is known that individual LEDs have a variation in forward voltage drop from unit to unit. Therefore, the strings of series-connected LEDs can have a variation in forward voltage drop.

Strings of series-connected LEDs can be coupled to a common switching regulator, e.g., a boost switching regulator, at one end of the LED strings, the switching regulator configured to provide a high enough voltage to supply each of the strings of LEDs. The other end of each of the strings of series-connected LEDs can be coupled to a respective current sink, configured to sink a relatively constant current through each of the strings of series-connected LEDs.

It will be appreciated that the voltage generated by the common switching regulator must be a high enough voltage to supply the one series-connected string of LEDs having the greatest total voltage drop, plus an overhead voltage needed for proper operation of the respective current sink. In other words, if three series-connected strings of LEDs have voltage drops of 23 Volts, 21 Volts and 20 Volts, and each respective current sink requires at least 0.6 Volts in order to operate, then the common boost switching regulator must supply at least 23.6 Volts.

SUMMARY

In one aspect, a circuit includes a plurality of comparators. Each comparator is configured to receive a first input from a corresponding load of a plurality of loads and to receive a second input as a regulation voltage. The circuit also includes an amplifier configured to receive signals provided by the plurality of comparators, a pulse-width modulation (PWM) circuit configured to receive a control signal from the amplifier and to provide a signal to a primary switch to control voltage provided to the loads and an output switch sequencer coupled to each of the comparators and configured to provide control signals to control switches coupled to the primary switch enabling one control switch to be active at a time. Each control switch provides a voltage increase to a respective load of the plurality of loads if enabled.

DESCRIPTION OF THE DRAWINGS

The foregoing features of the invention, as well as the invention itself may be more fully understood from the following detailed description of the drawings, in which.

DETAILED DESCRIPTION

Before describing the present invention, some introductory concepts and terminology are explained. The term "boost switching regulator" is used to describe a known type of switching regulator that provides an output voltage higher than an input voltage to the boost switching regulator. While a certain particular circuit topology of boost switching regulator is shown herein, it should be understood that boost switching regulators have a variety of circuit configurations. As used herein, the term "buck switching regulator" is used to describe a known type of switching regulator that provides an output voltage lower than an input voltage to the buck switching regulator. It should be understood that there are still other forms of switching regulators other than a boost switching regulator and other than a buck switching regulator, and this invention is not limited to any one type.

As used herein, the term "current regulator" is used to describe a circuit or a circuit component that can regulate a current passing through the circuit or circuit component to a predetermined, i.e., regulated, current. A current regulator can be a "current sink," which can input a regulated current, or a "current source," which can output a regulated current. A current regulator has a "current node" at which a current is output in the case of a current source, or at which a current is input in the case of a current sink.

Described herein are various embodiments including circuitry and techniques to drive a series of parallel loads each with a voltage tailored to the load. In particular, switches, each connected to a respective load, are activated sequentially (e.g., in a round-robin sequence) to provide the tailored voltages. As will be shown herein, providing a tailored voltage to each of the loads in this fashion reduces power consumption compared to a circuit configuration that drives all the loads (e.g., series diode strings) with the same voltage.

Figure 1:
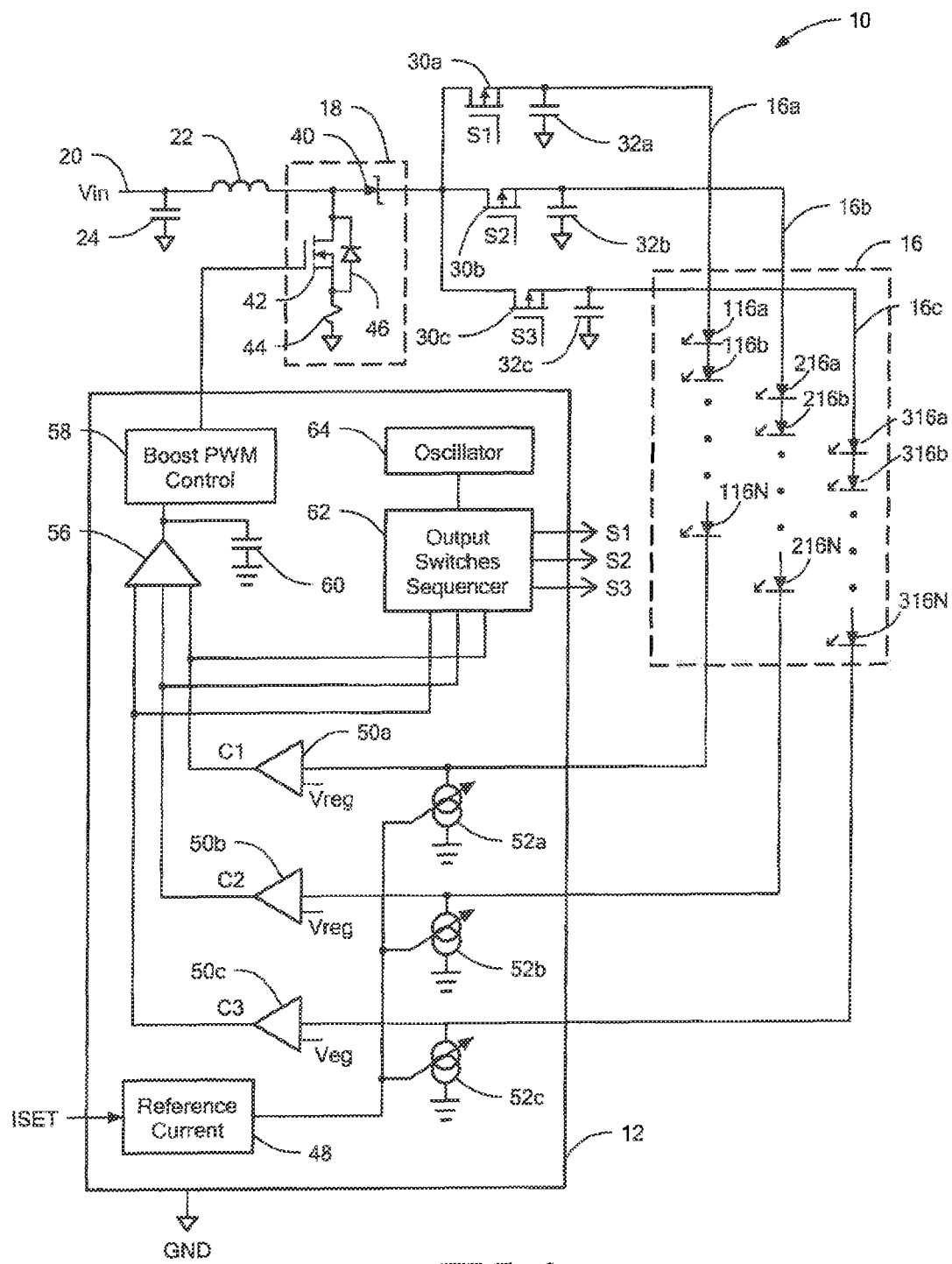
FIG. 1 is block diagram of a circuit to drive a plurality of loads individually.

Referring to FIG. 1, a circuit 10 includes an electronic circuit 12 (e.g., an integrated circuit (IC)) coupled to a plurality of loads 16 and a primary switch 18 used in switching regulators. The circuit 10 receives an input voltage, Vin, via a connection 20. The circuit 10 also includes an inductor 22 coupled to the primary switch 18 and to the connection 20 and a capacitor 24 coupled to the inductor 22 and the connection 20.

In one example, the loads 16 include a string 16a of series-connected LEDs (e.g., an LED 116a, an LED 116b, ..., an LED 116N), a string 16b of series-connected LEDs (e.g., an LED 216a, an LED 216b, ..., an LED 216N) and a string 16c of series-connected LEDs (e.g., an LED 316a, an LED 316b, ..., an LED 316N). While only three strings of series-connected LEDS are described, one of ordinary skill in the art can apply the techniques described herein to form loads with M strings of series-connected LEDs where M>1.

The primary switch 18 includes an FET 42 having a first terminal (e.g., a source of the FET 42) coupled to a resistor 44 and a second terminal (e.g., a drain of the FET 42) coupled to the inductor 22 and a diode 40 (e.g., a Schottky diode, a standard diode and so forth). A diode 46 is internally coupled to the first and second terminals of the FET 42.

Each string 16a-16c is coupled to an FET (field-effect transistor) switch (e.g., the string 16a is coupled to an FET switch 30a, the string 16b is coupled to a FET switch 30b and the string 16c is coupled to an FET switch 30c). The switches 30a-30c are referred to herein as control switches. Each FET switch 30a-30c has a terminal (e.g., a drain) coupled to the diode 40 and a second terminal (e.g., a source) coupled to a respective capacitor 32a-32c and string 16a-16c.

The circuit 12 includes comparators 50a-50c (e.g., inverting comparators). Each comparator 50a-50c is configured to receive a first input from a corresponding string 16a-16c and to receive a second input as a regulation voltage, Vreg. In one example, the regulation voltage is 650 mV. The comparator 50a provides an output signal C1, the comparator 50b provides an output signal C2 and the comparator 50a provides an output signal C1.

The circuit 12 also includes a multi-input amplifier 56 (e.g., a transconductance amplifier). The output of the amplifier 56 is coupled to a pulse width modulation (PWM) control circuit 58 and to a capacitor 60.

The circuit 12 further includes an output switch sequencer 62 that is coupled to the output of each of the comparators 50a-50c and coupled to gates of the FET switches 30a-30c. The output switch sequencer 62 is configured to provide signals S1, S2 and S3 to control a respective FET switch 50a-50c (e.g., the signal S1 controls the FET switch 50a, the signal S2 controls the FET switch 50b and the control signal S3 controls the FET switch 50c). The output switch sequencer 62 is coupled to an oscillator 64. The oscillator 64 provides switching clock pulses to both PWM control circuit 58 and output switch sequencer 62.

Current regulators 52a-52c (e.g., current sinks) are coupled to the first input of a corresponding comparator 50a-50c and to a reference current circuit 48. In one example, the current regulators 52a-52c are each configured to regulate the current through a corresponding string 16a-16c. In one example, each of the current regulators requires 0.6 Volts to operate. In one example, the reference current circuit 48 receives a set current, ISET, which is proportional to the LED current being controlled.

Figure 3:
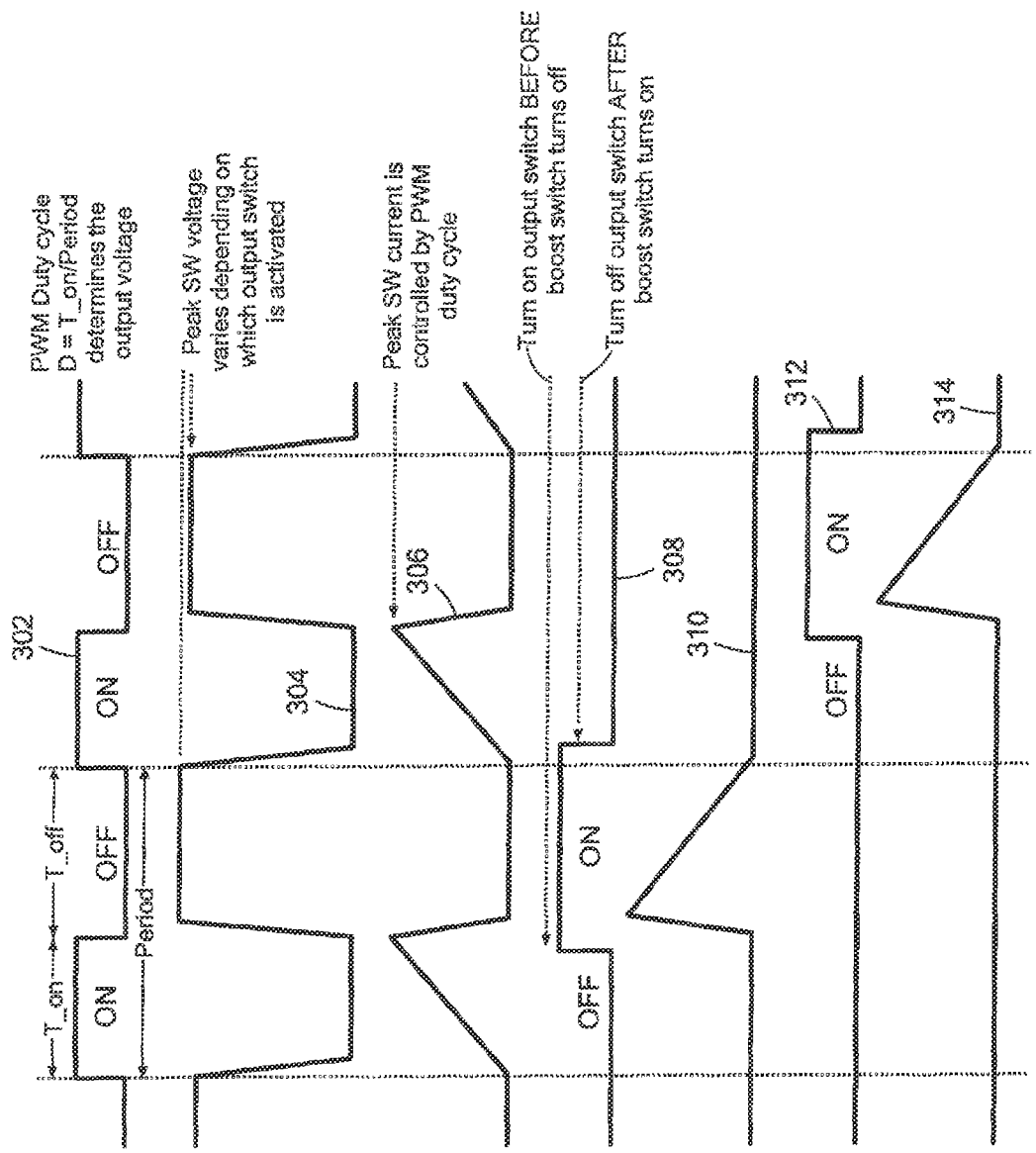
FIG. 3 is a graph of voltage and current versus time curves for signals provided to a control switch and the primary switch.

In one example, the primary switch 18, the inductor 22, the diode 40 and the PWM control circuit 58 form a boost switching regulator that controls the voltage applied to the loads 16. The primary switch 18, when enabled (i.e., closed), provides a current that builds up in the inductor 22. The primary switch 18, when disabled thereafter (i.e., opened), results in a voltage jump at the primary switch side of the inductor 22. To control the voltage to each of the strings 16a-16c, when the primary switch is closed the FET switches 30a-30c are open and when the primary switch 18 is open one of the FET switches 30a-30c is closed to receive energy from the inductor 22. In practice (as shown in FIG. 3), one of the switches 30a-30c is closed as the primary switch 18 is opened so that there is some overlap.

In one particular example, if any one of the strings 16a-16c is below the regulation voltage, Vreg, the output signal (i.e., the signals C1, C2 or C3) of the corresponding inverting comparator 50a, 50b or 50c provides a control signal to the amplifier 56 indicating that the string needs additional voltage from the boost switch regulator. In one particular example, if a string is below the regulation voltage then the corresponding comparator produces a high voltage signal. Thus, if any one of the output signals C1, C2 or C3 is high, then the amplifier 56 provides a signal to the PWM control circuit 58 to continue or to start to increase voltage to the string (e.g., increase the duty cycle of the PWM control circuit 58).

In addition, the output signals C1, C2 and C3 are provided to the output switch sequencer 62. Based on the output signals C1, C2 and C3, the output switch sequencer 62 provides the signals S1, S2, S3 to the respective FET switches 30a-30c based on a processing algorithm (e.g., a process 400 described in FIG. 4). The output switch sequencer 62 ensures that only one FET switch 30a, 30b or 30c is closed at a time so that only one of the capacitors 32a, 32b or 32c receives energy from the inductor 22 voltage at a time. When any switch 30a, 30b or 30c is open, voltage is temporarily held on a respective output capacitor 32a, 32b, 32c, and the voltage held at the respective capacitor 32a, 32b, 32c drives respective diode strings, 16a, 16b, 16c.

The circuit 10 saves significant power compared to prior art approaches. For example, in the prior art, there are no FET switches 30a-30c. If the string 16a requires 23 volts, the string 16b requires 21 volts and the string 16c requires 20 volts and each current regulator requires 0.6 Volts to operate then the output voltage from the primary switch 18 must provide at least 23.6 volts. Thus, the current regulators voltages are 0.6V, 2.6V and 3.6 volts respectively. If each LED string 16a-16c has a current of 250 mA, then the LED drivers are dissipating a total of 1.7 W. However, because circuit 10 includes the FET switches 30a-30c and the voltages are provided to the strings 16a-16c are tailored to the voltage drop of each string, voltages to each one of the current regulators 52a-52c are maintained at 0.6V. If the LED current through each string 16a-16c is 250 mA, then the power dissipation from the current regulators 52a-52c is only 0.45 W.

Figure 2A:
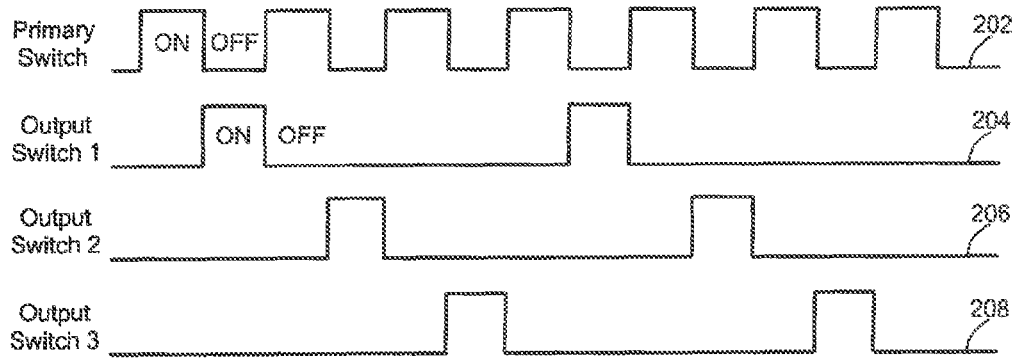
FIG. 2A to 2C are graphs of voltage versus time curves for signals provided to control switches and a primary switch.
Figure 2B:
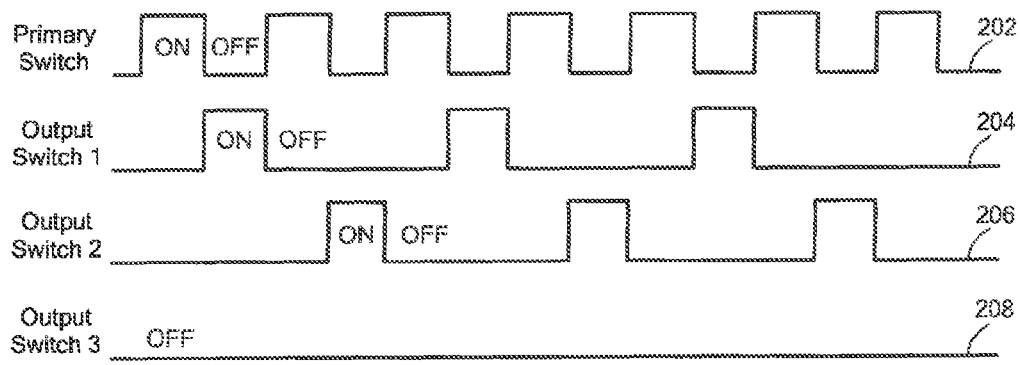
Figure 2C:
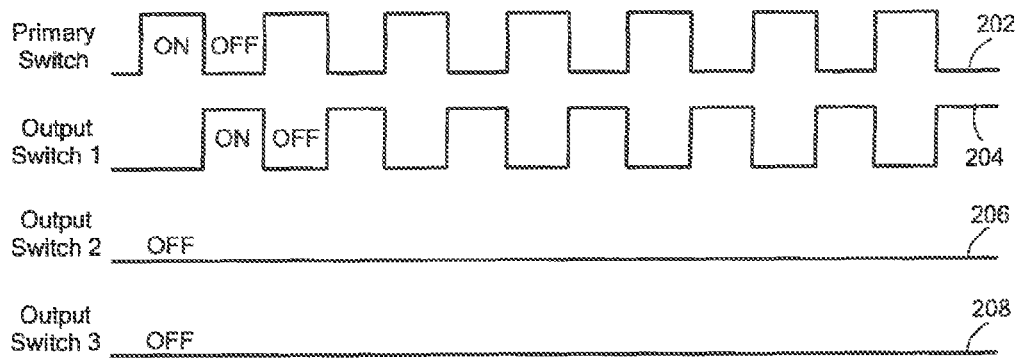

FIG. 2A depicts a PWM voltage signal 202 at the control node (gate) of the primary switch 18, a voltage signal 204 at the control node of FET switch 30a, a voltage signal 206 to the FET switch 30b, and a voltage signal 208 at the control node of the FET switch 30c for the case that none of the strings 16a-16c have achieved their operating voltage. FIG. 2B depicts the voltage signals 202-208 for the case when the string 16c has achieved its operating voltage while strings 16a, 16b have not achieved their operating voltage. FIG. 2C depicts the voltage signals 202-208 for the case when the strings 16b and 16c have achieved their operating voltage, but the string 16a may or may not achieved operating voltage. As explained previously, at least one FET switch 30a-30c should be closed when the primary switch 18 is off. Thus, even if the string 16a has achieved its operating voltage, its corresponding FET switch 30a is closed. Though not shown in FIG. 2C, if the string 16a has achieved its operating voltage, the duty cycle of the primary switch control signal can be reduced to be very short. It will be recognized to one of ordinary skill in the art that one of the control switches 30a-30c that remains open results in a decreasing voltage on a capacitor 32a, 32b or 32c to which it is connected. Thus, the decreasing voltage eventually causes the switch to close again as in the sequence of FIG. 2A.

FIG. 3 is a zoomed-in-view of the timing diagrams for the primary switch 18 and two of the output switches (FET switches 30a, 30b). In particular, FIG. 3 depicts a control signal 302 (from the Boost PWM control circuit 58) to the primary switch 18, a voltage signal 304 from the primary switch 18, a current signal 306 through the primary switch 18 (which is equal to the current through the inductor 22 when the switch 18 is closed), a control signal 308 (i.e., signal S1) at the control node of the FET switch 30a, a current signal 310 of the FET switch 30a, a control signal 312 (i.e., signal S2) at the control node of the FET switch 30b and a current signal 314 of the FET switch 30b.

FIG. 3 shows that the output switch (FET switch 30a) is turned on (see control signal 308) just before the primary switch 18 is completely turned off (see control signal 302). From the control signal 302, the PWM duty cycle, D (=T_on/Period), determines the output voltage. The peak SW voltage, in voltage signal 304, varies depending on which output switch (i.e., FET 30a, 30b or 30c) is activated. The peak SW current, in current signal 306, is controlled by PWM duty cycle.

Figure 4:
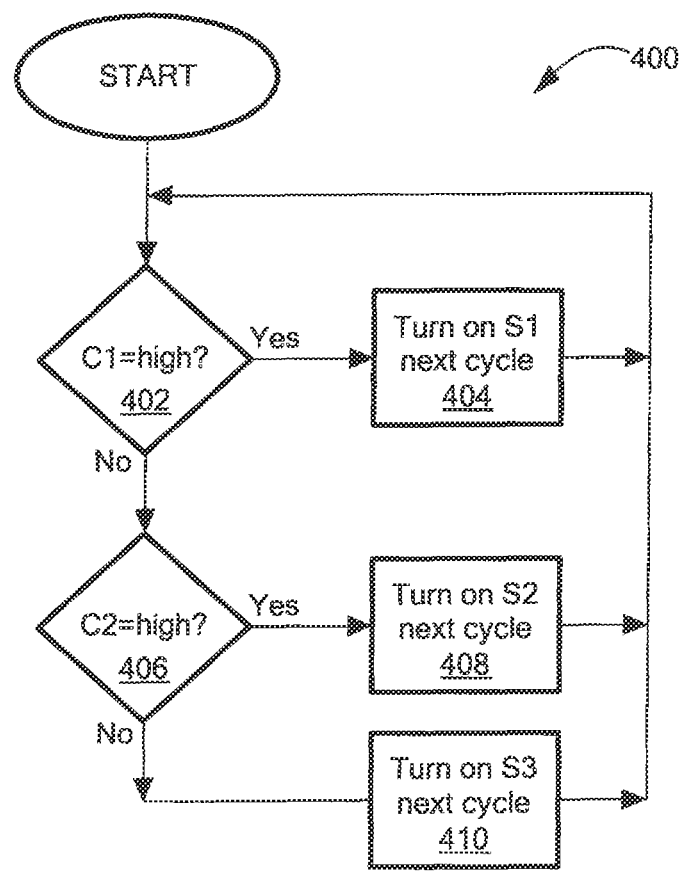
FIG. 4 is a flowchart of an example of a process to control the control switches.

Referring to FIG. 4, one example of a process for the output switch sequencer 62 to perform sequencing is a process 400. Process 400 determines if the signal C1 is high (402). If the signal C1 is high, process 400 turns on signal S1 in the next cycle (404) to close the corresponding FET switch for a period of time. For example, the FET switch 30a is closed for a period corresponding to a percentage (e.g., 50%) of a PWM control signal period.

If the signal C1 is not high, process 400 determines if the signal C2 is high (406). If the signal C2 is high, process 400 turns on signal S2 in the next cycle (408) to close the corresponding FET switch for a period of time. For example, the FET switch 30b is closed for a period corresponding to a percentage (e.g., 50%) of a PWM control signal period.

If the signal C2 is low, process turns on signal S3 in the next cycle (410) to close the corresponding FET switch for a period of time. For example, the FET switch 30c is closed for a period corresponding to a percentage (e.g., 50%) of a PWM control signal period. Process 400 returns to processing block 402 and determines if the signal C1 is high.

As explained previously, when the primary switch 18 is in the off position, one of the switches 30a-30c should be closed to discharge energy from the inductor 22. In one example not shown in FIG. 4, process 400 determines if signals C1, C2 and C3 are all low. If all of the signals are low, process 400 closes any one of the FET switches 30a-30c for a period of time.

Figure 5:
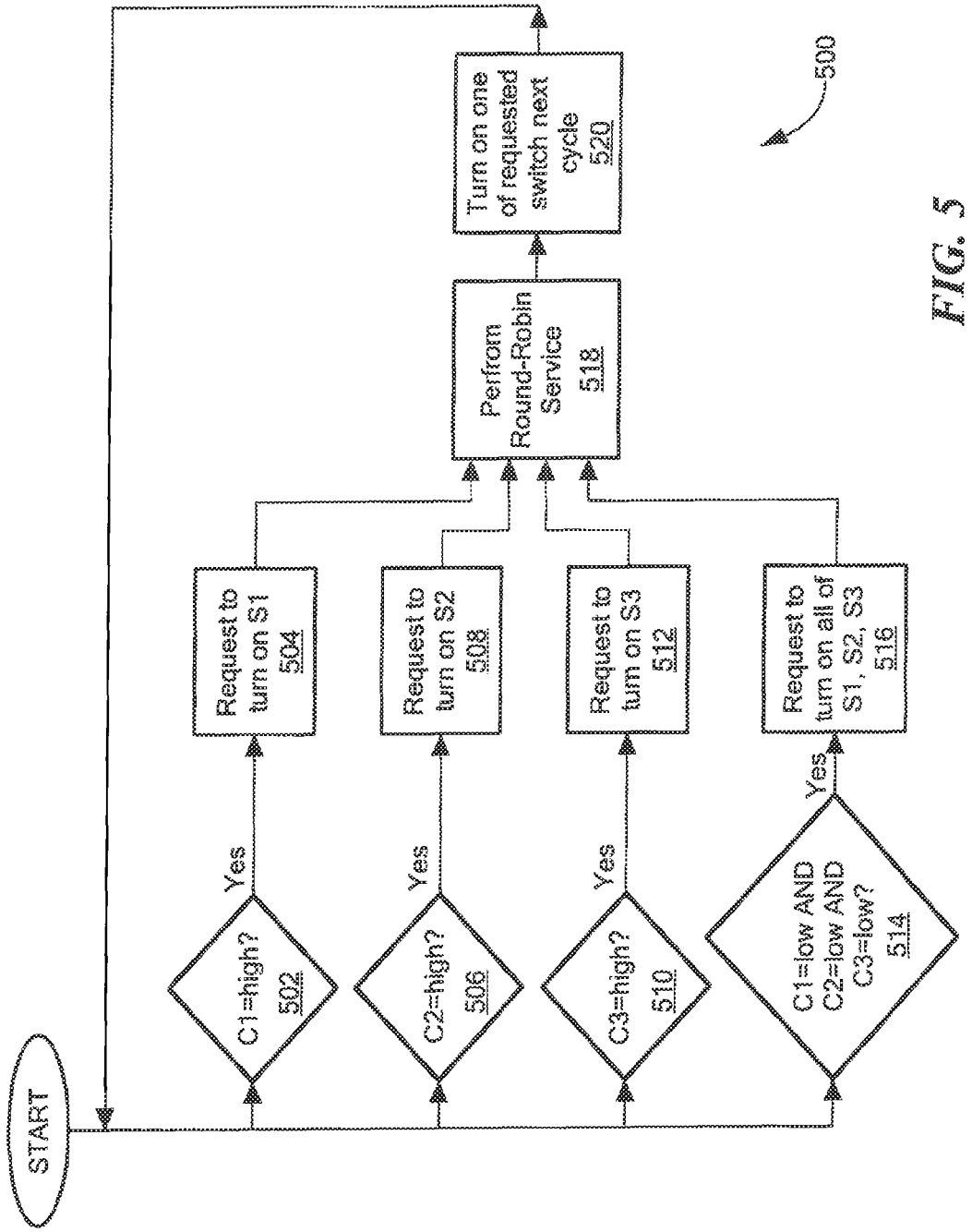
FIG. 5 is a flowchart of another example of a process to control the control switches.

Referring to FIG. 5, another example of a process for the output switch sequencer 62 to perform sequencing is a process 500. In process 500, the signals C1, C2, C3 have equal priority in requesting additional current. If only one of signals C1, C2, C3 is requesting additional current its corresponding output switch is turned on in the next switching cycle. If two or more signals C1, C2, C3 are requesting additional current, they are serviced in a round-robin manner in subsequent switching cycles.

In particular, process 500 determines if the signal C1 is high (502) and if the signal C1 is high, process 500 requests to turn on signal S1 (504). Process 500 determines if the signal C2 is high (506) and if the signal C2 is high, process 500 requests to turn on signal S2 (508). Process 500 determines if the signal C3 is high (510) and if the signal C3 is high, process 500 requests to turn on signal S3 (512). Process 500 determines if the signals C1, C2, C3 are all low (514) and if the signals C1, C2, C3 are all low, process 500 requests to turn on all signals S1, S2, S3 (516). Process 500 performs a round-robin service to determine which one of the switches (i.e., which one of FET switches 30a-30c) to turn on (close) (518) and turns on (closes) that switch (520).

The processes described herein are not limited to the specific embodiments described. For example, the processes 400 and 500 are not limited to the specific processing order of FIGS. 4 and 5, respectively. Rather, any of the processing blocks of FIGS. 4 and 5 may be re-ordered, combined or removed, performed in parallel or in serial, as necessary, to achieve the results set forth above.

The processing blocks in FIGS. 4 and 5 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A circuit comprising:
a plurality of comparators, each comparator being configured to receive a first input from a corresponding load of a plurality of loads and to receive a second input as a regulation voltage;
an amplifier being configured to receive signals provided by the plurality of comparators;
a pulse-width modulation (PWM) circuit being configured to receive a control signal from the amplifier and to provide a signal to a primary switch to control voltage provided to the loads; and
an output switch sequencer coupled to each of the comparators and configured to provide control signals to control switches coupled to the primary switch enabling one control switch to be active at a time, each control switch providing a voltage increase to a respective load of the plurality of loads if enabled.

2. The circuit of claim 1, further comprising a plurality of diodes, each diode being coupled to an output of a corresponding comparator and an input of the amplifier.

3. The circuit of claim 1, further comprising a plurality of current regulator circuits, each regulator circuit coupled to a corresponding load of the plurality of loads and to a corresponding comparator of the plurality of comparators.

4. The circuit of claim 1 wherein the plurality of loads comprises a plurality of series-connected light-emitting diode (LED) strings.

5. The circuit of claim 1 wherein the primary switch comprises a field-effect transistor (FET) having a gate coupled to the PWM circuit and one of drain or source coupled to an inductor and a diode.

6. The circuit of claim 5 wherein the diode is coupled to the control switches.

7. The circuit of claim 5 wherein the inductor is coupled to an input voltage.

8. The circuit of claim 7, further comprising a capacitor coupled at a first end to ground and a second end to the inductor and the input voltage.

9. The circuit of claim 1 wherein each control switch comprises an FET having a gate coupled to the output switch sequencer.

10. The circuit of claim 1, further comprising a respective capacitor coupled to an output of each control switch.

* * * * *

UNITED STATES PATENT AND TRADEMARK OFFICE
CERTIFICATE OF CORRECTION

PATENT NO.        : 8,610,371 B2                                           Page 1 of 1
APPLICATION NO.   : 13/334250
DATED             : December 17, 2013
INVENTOR(S)       : Nai-Chi Lee et al.

It is certified that error appears in the above-identified patent and that said Letters Patent is hereby corrected as shown below:

In the Specification

Column 1, Line 57, delete "FIG. 1 is block" and replace with --FIG. 1 is a block--.

Column 1, Line 59, delete "FIG. 2A to 2C" and replace with --FIGS. 2A to 2C--.

Column 4, Line 65, delete "FET 30a" and replace with --FET switch 30a--.

Signed and Sealed this
Thirtieth Day of June, 2015

Michelle K. Lee
*Director of the United States Patent and Trademark Office*